(12) United States Patent
Vella et al.

(10) Patent No.: US 10,418,146 B2
(45) Date of Patent: Sep. 17, 2019

(54) CONDUCTIVE POLYMER COMPOSITE

(71) Applicant: XEROX CORPORATION, Norwalk, CT (US)

(72) Inventors: Sarah J. Vella, Milton (CA); Rachel Prestayko, Hamilton (CA); Carolyn Moorlag, Mississauga (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 258 days.

(21) Appl. No.: 15/000,609

(22) Filed: Jan. 19, 2016

(65) Prior Publication Data

US 2017/0207001 A1    Jul. 20, 2017

(51) Int. Cl.

| H01B 1/24 | (2006.01) |
| C09D 5/24 | (2006.01) |
| B29C 70/88 | (2006.01) |
| B29C 64/118 | (2017.01) |
| C09D 7/40 | (2018.01) |
| B33Y 10/00 | (2015.01) |
| B33Y 70/00 | (2015.01) |
| B29K 67/00 | (2006.01) |
| B29K 105/00 | (2006.01) |
| B29K 105/16 | (2006.01) |
| B29K 505/00 | (2006.01) |
| B29K 507/04 | (2006.01) |

(52) U.S. Cl.
CPC .............. *H01B 1/24* (2013.01); *B29C 64/118* (2017.08); *B29C 70/882* (2013.01); *C09D 5/24* (2013.01); *C09D 7/40* (2018.01); *B29K 2067/04* (2013.01); *B29K 2105/007* (2013.01); *B29K 2105/167* (2013.01); *B29K 2505/00* (2013.01); *B29K 2507/04* (2013.01); *B29K 2995/0005* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| 4,769,177 | A | 9/1988 | Hocker et al. | |
| 5,789,680 | A | 8/1998 | Fujimoto | |
| 7,925,454 | B1 | 4/2011 | Narcus | |
| 8,865,604 | B2 | 10/2014 | Wasynczuk | |
| 2004/0016912 | A1* | 1/2004 | Bandyopadhyay | C08K 3/04 252/500 |
| 2011/0028678 | A1* | 2/2011 | Matsuzono | C08G 63/16 528/272 |
| 2011/0214284 | A1* | 9/2011 | Xu | H01B 1/22 29/825 |
| 2011/0260116 | A1 | 10/2011 | Plee et al. | |
| 2012/0024353 | A1 | 2/2012 | Ge et al. | |
| 2012/0247808 | A1* | 10/2012 | Lam | H01B 1/02 174/126.2 |
| 2015/0123043 | A1 | 5/2015 | Nagamune et al. | |
| 2016/0198576 | A1 | 7/2016 | Lewis et al. | |
| 2017/0129182 | A1 | 5/2017 | Sauti et al. | |
| 2017/0151704 | A1 | 6/2017 | Go et al. | |
| 2017/0206999 | A1 | 7/2017 | Prestayko et al. | |
| 2017/0207000 | A1 | 7/2017 | Prestayko et al. | |
| 2017/0207001 | A1 | 7/2017 | Vella et al. | |
| 2017/0267532 | A1* | 9/2017 | Liu | C01B 31/0273 |
| 2017/0284876 | A1 | 10/2017 | Moorlag et al. | |
| 2017/0297262 | A1 | 10/2017 | Grigorian | |
| 2017/0346129 | A1 | 11/2017 | Stolyarov et al. | |
| 2018/0049655 | A1 | 2/2018 | Melnykowycz et al. | |

FOREIGN PATENT DOCUMENTS

| CA | 2915409 A1 | 12/2014 |
| EP | 2 489 442 A1 | 8/2012 |

OTHER PUBLICATIONS

Nature Nanotechnology May 2010, 853.*
Office Action dated Mar. 2, 2018 from related Canadian Application No. 2,957,114.

* cited by examiner

*Primary Examiner* — Robert T Butcher
(74) *Attorney, Agent, or Firm* — MH2 Technology Law Group LLP (57) ABSTRACT

A conductive polymer composite is disclosed. The composite comprises a thermoplastic polymer and a plurality of metal-plated carbon nanotubes. A method of three dimensional printing using the conductive polymer composite and a filament comprising the conductive polymer composite are also disclosed.

20 Claims, 6 Drawing Sheets

FIG. 3B

CONDUCTIVE POLYMER COMPOSITE

DETAILED DESCRIPTION

Field of the Disclosure

The present disclosure is directed to a conductive polymer composite.

Background

Additive manufacturing (also known as three dimensional printing) as practiced in industry has been, to date, mostly concerned with printing structural features. There is a need for materials and processes that integrate functional properties (such as electronic features) into additive manufacturing. Recently, conductive materials that are potentially useful in additive manufacturing have been commercialized, but their conductivities are generally low, ranging from ~$10^{-6}$ S/cm to ~0.5 S/cm, although some materials with higher conductivities (e.g., ~2.0 S/cm) are known. Mechanical properties of the commercially available materials, particularly the conductive materials such as Acrylonitrile butadiene styrene (ABS) or polylactic acid (PLA), are generally limited (e.g., are not flexible).

Common techniques in additive manufacturing utilize the extrusion of pastes or a thermoplastic polymers. Pastes can be extruded at room temperature or elevated temperatures, whereas thermoplastics are heated to a molten state in order to be extruded. In fused deposition modeling (FDM), for example, a thermoplastic filament is fed into a hot zone for continuous extrusion. The molten polymer can be deposited layer by layer onto a build plate in order to form 3D objects.

There is great interest in the field of additive manufacturing to develop improved materials that can be used to easily print completely integrated functional objects with limited post-assembly. This would allow completely new designs in the manufacturing and consumption of everyday objects, particularly when they can be enabled with conductive materials. The capability of printing conductive components within an object can provide the potential for embedded sensors and electronics. Therefore, increasing the conductivity of plastic composites for three dimensional printing is of great interest.

It is generally well known in the art to include additives into polymers to increase electrical conductivity. For example, carbon nanotubes have been added to polymers to increase conductivity in order to provide antistatic properties in xerographic components. Electroless deposition of metals, such as copper or silver, on carbon nanotubes is also generally known. Compositions with silver nanoparticles adsorbed (as opposed to electrolessly plated) onto MWCNTs in combination with silver flake and ionic liquids are known, as described in *Nature Nanotechnology* 2010, 5, 853, the disclosure of which is hereby incorporated by reference in its entirety. These composite materials were prepared for solution casting of films. The metal was not plated directly onto the MWCNT using electroless deposition, but instead involved adsorbing pre-formed nanoparticles onto the carbon nanotubes based on π-π interactions of the nanoparticle ligands.

While conductive polymers are generally well known, as described above, there are very few materials available for three dimensional printing currently on the market that exhibit electrical conductivity. This is at least in part due to the stringent processability requirements of materials used for three dimensional printing, which include the ability to be extruded and to be formed into complex printed shapes while retaining desired material characteristics of the final product. Materials that are available have relatively low conductivities, which limits the range of potential applications. The materials are typically constructed such that one conductive material forms a percolating network through an insulating polymer base, such that electrons have a continuous pathway to flow. The formation of this conductive network is limited to the way the conductive particles are arranged within the polymer base. Although these materials have been extensively explored in both academia and industry, the focus is typically on minimizing the amount of conductive additive required to form a percolating network, where the conductivity is relatively low.

Novel plastic composite materials that are suitable for three dimensional printing and that exhibit increased conductivity would be a welcome step forward in the art. Such materials could have significant impacts in the field of additive manufacturing.

SUMMARY

An embodiment of the present disclosure is directed to a conductive polymer composite. The composite comprises a thermoplastic polymer; and a plurality of metal-plated carbon nanotubes.

An embodiment of the present disclosure is directed to a method of three dimensional printing. The method comprises providing a composite to a three-dimensional printer. The composite comprises a thermoplastic polymer and a plurality of metal-plated carbon nanotubes. The composite is heated and the heated composite is extruded onto a substrate to form a three dimensional object.

Yet another embodiment of the present disclosure is directed to a conductive polymer composite filament. The filament comprises a thermoplastic polymer; and a plurality of metal-plated carbon nanotubes.

The compositions of the present application exhibit one or more of the following advantages: improved conductivity of filaments for 3D printing applications, such as fused deposition modeling (FDM); plating MWCNT with metal improved the conductivity of the composite material compared to the composite with non-plated MWCNT; a synergistic increase in conductivity for composites with metal plated multiwall carbon nanotubes and a second metallic additive as compared to either the MWCNT alone in PCL or flake/nanoparticle/nanowire alone in PCL composites; the measured Young's and/or Flex moduli of the composite materials indicate that they maintain a similar degree of flexibility as the base polymer; and/or an improved method for increasing the electrical conductivity in polymer composites while retaining material properties suitable for additive manufacturing.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that forms a part thereof, and in which is shown by way of illustration specific exemplary embodiments in which the present teachings may be practiced. The following description is, therefore, merely exemplary.

An embodiment of the present disclosure is directed to a conductive polymer composite. The composite comprises a thermoplastic polymer and a plurality of metal-plated carbon nanotubes. The composites exhibit higher conductivities then the same composites that employ non-metal plated carbon nanotubes at the same loadings.

Any suitable thermoplastic polymer useful in three dimensional printing can be employed in the composites of the present disclosure. The composite can include a single polymer or mixtures of thermoplastic polymers, including mixtures of any of the thermoplastic polymers disclosed herein. In an embodiment, the thermoplastic polymer comprises at least one repeating unit selected from the group consisting of acrylate units, carboxylic acid ester units, amide units, lactic acid units, benzimidazole units, carbonate ester units, ether units, sulfone units, arylketone units, arylether units, etherimide units, ethylene units, phenylene oxide units, propylene units, styrene units, vinyl halide units and carbamate units. In an embodiment, the thermoplastic polymer is a copolymer, such as a block copolymer, of two or more of any of the above listed repeating units. As an example, the thermoplastic polymer can comprise at least one polymer selected from the group consisting of polyacrylates, polybenzimidazoles, polycarbonates, polyether sulfones, polyaryl ether ketones such as polyether ether ketone, polyetherimide, polyethylenes such as polyethylene and poly(ethylene-co-vinylacetate), polyphenylene oxides, polypropylenes such as polypropylene and Poly(vinylidene fluoride-co-hexafluoropropylene), polystyrenes such as polystyrene, poly(styrene isoprene styrene), acrylonitrile butadiene styrene (ABS) and poly(Styrene Ethylene Butylene Styrene) (SEBS), polyesters such as polyethylene terephthalate, polylactic acid (PLA) and polycaprolactone, polyurethanes, polyamides such as nylon, Poly(vinylidene fluoride) (PVDF) and polyvinyl chlorides. In an embodiment, the thermoplastic polymer does not include Acrylonitrile butadiene styrene (ABS) or PLA.

In an embodiment, the thermoplastic polymer is selected from the group consisting of polyacrylates and copolymer of acrylates, such as block copolymers of acrylates. The acrylate copolymers can comprise at least one acrylate monomer and optionally one or more additional monomers such as any of those monomers listed above for use in the thermoplastic polymers. Such polymers can be formulated to have a desired degree of flexibility. In an embodiment, the polymer can be a polyester, such as polycaprolactone.

The use of thermoplastics, as opposed to epoxies or other thermoset type polymers, can allow the composite to be thermally processed more than once in order to reform the material. This can allow the material to be heated to melting to form, for example, a filament for use with a three dimensional printer. The filament composite can then be heated to melting again during the extrusion process of three dimensional printing.

For many products it can be advantageous to employ elastomeric polymers that have a certain desired degree of elasticity and/or flexibility, which can be characterized by Young's modulus and flexural modulus. In the present disclosure, the ASTM D638 method was used to determine the Young's modulus of the materials. The ASTM D790 Plastic Flexural 3 Point Bend Test was used to determine the flexural modulus of the materials. As an example, the materials of the present disclosure can have a Young's modulus of less 1.5 GPa, such as less than 1 GPa, or less than 0.5 Gpa. As another example, the material can have a flexural modulus of less 2 GPa, such as less than 1 GPa, or less than 0.5 Gpa.

The thermoplastic polymer can be included in the composite in any suitable amount that will allow the composite to function in a three dimensional printing process. Examples of suitable amounts include a range of from about 30% to about 99.5% by weight, such as about 50 to about 99, or about 50 to about 95, relative to the total weight of the conductive polymer composite.

The metal-plated carbon nanotubes can comprise any suitable metal plating that enhances the conductivity of the composite. As examples, the metal plating comprises at least one metal selected from the group consisting of silver, copper, nickel, palladium, cobalt and gold. The metal plating can be a pure metal or an alloy of any of these metals. In an embodiment, the metal has a purity of 90% by weight or more, such as 95%, 98%, 99% or 100% by weight purity, where the metal is chosen from any of those listed above. For example the metal can be 95% or higher by weight of silver, such as substantially 100% pure silver. In an embodiment, the metal-plated or metal-alloy plated carbon nanotubes are electrolessly plated carbon nanotubes. While any coating methods may be used, it is theorized that directly plating the metals onto the carbon nanotubes may provide improved conductivity over some other coating methods.

Electroless deposition onto the nanotubes can be carried out in any suitable manner. Various examples of suitable electroless deposition techniques are known in the art. For example, one known technique for electroless deposition of silver onto multiwalled carbon nanotubes involves the following steps: (i) oxidation of the CNTs (e.g., using air-plasma oxidation or reflux in concentrated acid bath); (ii) sensitization of the surface (e.g., adsorption of a $Sn^{2+}$) (also called pre-activation); (iii) an optional acceleration step (e.g., using HCl to etch the Cl ion shell from the $Sn^{2+}$ core); activation/reduction of Ag or Pd to replace the $Sn^{2+}$ ions (sometimes done in the same step as the sensitization); and electroless deposition of metal (e.g., autocatalytic reduction of Ag). Other suitable electroless deposition methods can also be employed.

Any suitable carbon nanotubes can be employed as the substrate for the metal plating. Examples of suitable carbon nanotubes include single walled carbon nanotubes, multi-walled carbon nanotubes and mixtures thereof. In an embodiment, the carbon nanotubes are multiwalled carbon nanotubes. Nanotubes with any suitable dimensions can also be employed. As examples, the length of the carbon nanotubes can range from 0.045 um to 200 um and the outer diameter can range from 1 nm to 30 nm. As a further example, the length-to-outer diameter aspect ratio can range from 50 to 5000. Commercially available sources of carbon nanotubes include, for example, carbon nanotubes available from CHEAPTUBES™ or NANOCYL™, such as Nanocyl 7000.

The composite can include the metal-plated carbon nanotubes in any suitable amount that will provide the desired conductivity while still maintaining the desired material properties and desired processability. Example amounts of carbon nanotubes include a range of from 1% to about 50% by weight, such as about 2% to about 20% by weight, or about 5% to about 15%, or about 10% by weight, relative to the total weight of the conductive polymer composite.

In an embodiment the composite can comprise a plurality of optional conductive particles that are not metal-plated carbon nanotubes. The addition of the optional conductive particles can further contribute to the existing percolating network formed by the metallized carbon nanotubes, thereby further increasing conductivity. The optional conductive particles can have any desired form, such as, for example, at least one particle selected from the group consisting of metallic wires, metallic flakes, and metallic nanoparticles. Again, these optional wires and nanoparticles are not metal coated carbon nanotubes. The optional particles can comprise any suitable conductive material, such as, for example, metals, such as gold, silver, aluminum and copper, as well as graphene, graphite, and carbon nanotubes and carbon nanofibers that are not metal plated. Examples of such particles include gold, silver, aluminum or copper nanowires, gold, silver, aluminum or copper nanoparticles and gold, silver, aluminum or copper flakes. The optional conductive particles can be in any suitable amount, such as an amount ranging from about 1% to about 50% by weight, such as about 5% to about 50% by weight, or about 1% to about 30% by weight, or about 5% to about 30% by weight, or about 10% to about 30% by weight, or about 20% to about 30% by weight, relative to the total weight of the conductive polymer composite.

The conductive polymer composites of the present disclosure can include any other suitable optional ingredients in any desired amounts, such as carrier liquids, plasticizers, dispersants and surfactants. Alternatively, ingredients not expressly recited in the present disclosure can be limited and/or excluded from the conductive polymer composites disclosed herein. Thus, the amounts of the thermoplastic polymer, metal-plated carbon nanotubes, with or without any optional ingredients as recited herein such as conductive particles, carrier liquids, plasticizers, dispersants and surfactants, can add up to 90% to 100% by weight of the total ingredients employed in the composites of the present disclosure, such as 95% to 100% by weight, or 98% to 100% by weight, or 99% to 100% by weight, or 100% by weight of the total ingredients.

The composite of the present disclosure can be in any suitable form. In an embodiment, the composite is a conductive paste. The paste can be a paste at room temperature or a material that needs to be heated in order to flow like a paste. In an embodiment, the paste comprises at least one carrier liquid. In an embodiment, the carrier liquid may be a solvent capable of dissolving one or more of the paste ingredients. In another embodiment, the carrier liquid is not a solvent. Suitable carrier liquids for the paste include, for example, toluene, pyrrolidones (e.g. N-methylpyrrolidone, 1-cyclohexyl-2-pyrrolidone), N,N-dimethylformamide (DMF), N,N-dimethylacetamide dimethylsulfoxide and hexamethylphosphoramide. The carrier liquid can be included in the paste in any suitable amount, such as, for example, about 0.5% to about 60% weight percent based on the total weight of the wet composite paste. Optional additives that can be included in the paste are, for example, dispersants, surfactants, other solvents in addition to the carrier liquid and other conductive additives.

In an alternative embodiment, the composite can be in the form of a dry composite having less than 5% liquid carrier, such as less than 3%, 2% or 1 liquid carrier by weight relative to the total weight of the dry composite, such as no liquid carrier. The dry composite can be formed using solvent, which is then removed by any suitable method, such as by heating, vacuum and/or other liquid removal techniques. Alternatively, the composite can be made without carrier liquid or solvent using neat processing techniques.

The composite has a bulk conductivity ranging from about 0.0001 S/cm to about 200 S/cm, such as about 0.5 to about 100 S/cm, or about 0.6 to about 5 S/cm. Bulk conductivity is calculated using the formula, $$\sigma = L/(R*A) \quad (1)$$

Where:
σ is bulk electrical conductivity;
L is length of the filament;
R is measured resistance of an extruded filament;
A is the cross-sectional area ($\pi r^2$) of the filament, where r is the radius of the filament.

The resistance, R, can be measured by forming an extruded filament made from the composite. The tips of the filament are painted with silver to provide good electrical connections with the testing equipment (e.g., a digital multimeter), but would not necessarily be painted if the filaments were to be used in additive manufacturing. Resistance can then be measured across the length of the filament. The dimensions of the filament and the measured value for R can then be used to calculate bulk conductivity (σ) of the composite.

The composites of the present disclosure can demonstrate an increase in conductivity of the metal-plated composite materials compared to the same composites made with non-metal-plated CNTs. In an embodiment, composites of the present disclosure that include metal plated carbon nanotubes demonstrate an increase in conductivity compared to the same composites made with non-metal-plated CNTs and where the same content of metal by weight that is used to plate the CNTs is also employed in the polymer with the carbon nanotubes, the metal being in the form of nanoparticles instead of being plated on the nanotubes. In an embodiment, the composites of the present disclosure demonstrate a further synergistic increase in conductivity when the additional, optional conductive additives described herein are incorporated into the composite material by contributing to the already existing conductive network of metal plated CNT.

While improving conductivity, the composites of the present disclosure can also retain a desired degree of processability that allows their use for additive manufacturing, which is not always the case for CNT-filled composites because they can become very stiff. Thus, filaments made using the composites of the present disclosure may be more flexible than some other materials for FDM printing that are currently commercially available. The degree of flexibility will depend on the thermoplastic polymer materials and optional fillers employed. In an embodiment, the composite materials can maintain a similar degree of flexibility as the base polymer. For example, the composite with the metal-plated carbon nanotubes can exhibit an increase in Young's modulus of less than 500 MPa, such as less than 300 MPa, when compared with the thermoplastic polymer alone, as measured by the ASTM D638 test for Young's Modulus.

The composites of the present disclosure can be made by any suitable method. For example, the thermoplastic polymer can be combined with the metal-plated carbon nanotubes and any optional ingredients, such as any of the other ingredients disclosed herein, using melt mixing techniques. Optional solvents and/or liquid carriers can be employed in the mixtures if desired. Other suitable techniques for mixing such compositions are well known in the art.

The present disclosure is also directed to a method of three dimensional printing. Any type of three dimensional printing can be employed, such as filament printing (e.g., FDM) or paste extrusion. The method includes providing any of the conductive polymer composites of the present disclosure to a three dimensional printer. The composite can be in any suitable form useful in three dimensional printing, such as a filament or paste. The conductive polymer can be heated to a molten state suitable for extrusion. Then the heated conductive polymer is extruded onto a substrate to form a three dimensional object.

The conductive polymer composites of the present disclosure can be used in a FDM process by first forming the composite into a filament having a desired shape and dimensions (e.g., by extrusion or any other suitable process). The filament can have any suitable shape that will allow the filament to be loaded into a 3 D FDM printer and printed. The filament, as initially supplied, can have a continuous length that is much longer than its thickness, T, (shown in FIG. 1) such as a ratio of length to thickness that is greater than 100 to 1, such as greater than 500 to 1 or 1000 to 1 or more, where T is the smallest thickness dimension of the filament (e.g., the diameter if the filament has a circular cross-section). Any suitable thickness can be used, and may depend on the 3D printer being used. As an example, thicknesses can range from about 0.1 mm to about 10 mm, such as about 0.5 mm to about 5 mm, or about 1 mm to about 3 mm.

Figure 1:
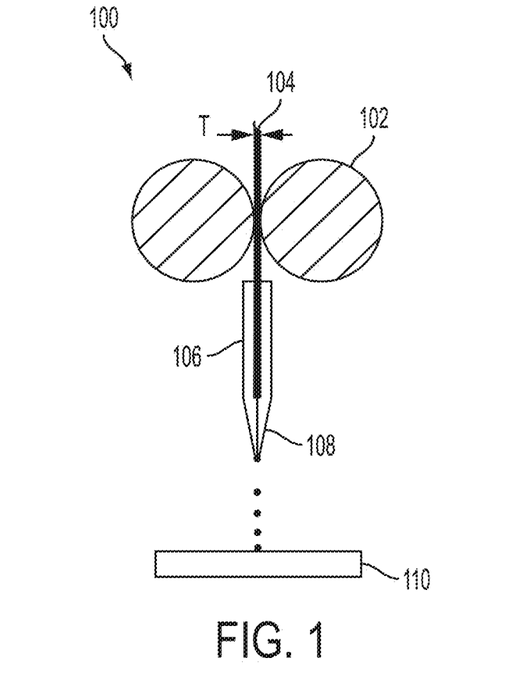
FIG. 1 illustrates a three-dimensional printer employing a filament made with the compositions of the present disclosure.

An example of a three dimensional printer 100 employing a filament of the present disclosure is shown in FIG. 1. The three dimensional printer 100 includes a feeder mechanism 102 for supplying the filament 104 to a liquifier 106. The liquifier 106 melts the filament 104 and the resulting molten plastic is extruded through a nozzle 108 and deposited on a build platform 110. The feeder mechanism 102 can comprise rollers or any other suitable mechanism capable of supplying the filament 104 from, for example, a spool of filament (not shown). The liquifier 106 can employ any technique for heating the filament, such as heating elements, lasers and so forth. The three dimensional printer 100 as shown in FIG. 1 is exemplary only and any type of three dimensional printer can be employed to deposit the filaments of the present disclosure.

With respect to the Examples below, it is noted that the electroless plating, melt mixing, and filament extrusion conditions were not optimized. Thus, it is likely that with further optimization, higher conductivities than those presented here would be measured.

EXAMPLES

Example 1

Figure 2A:
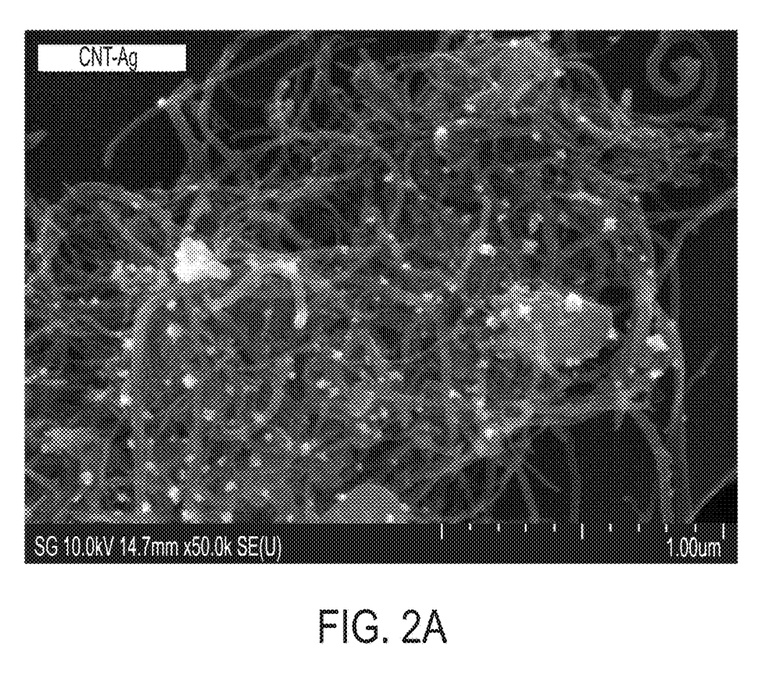
FIG. 2A shows an SEM image of multiwalled carbon nanotubes ("MWCNTs") decorated with silver particles, according to an example of the present disclosure.
Figure 2B:
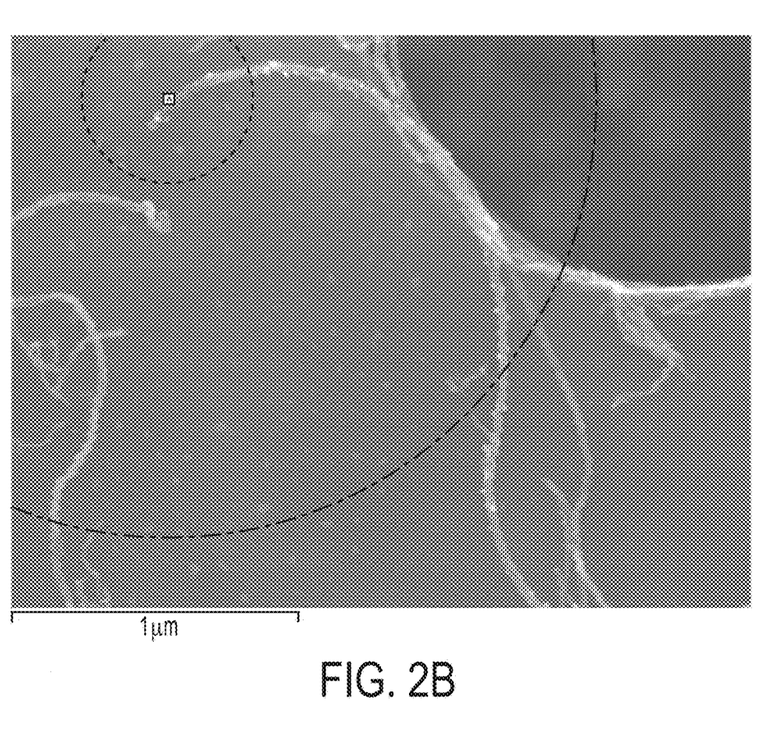
FIG. 2B is an SEM image of the MWCNTs decorated with silver particles (bright spots in the image) on a TEM holder, according to an example of the present disclosure.

Each solution (~300 mL) was prepared in separate 500 mL disposable containers. Air-plasma treatment or reflux in concentrated nitric acid solution was carried out to oxidize the surface of MWCNT's (5.5 g). The oxidized MWCNT's were added to the sensitization solution (30 min) (0.1M $SnCl_2$, 0.1 M $HCl_{(aq)}$), then the activation solution (30 min) (0.0014 $PdCl_2$, 0.25M HCl in DI water) and finally the electroless plating solution (10 min) (0.059 M $AgNO_3$, 4.5 mL $NH_4OH_{conc}$, 9 mL of 37% formaldehyde solution). Formaldehyde was added slowly to the plating solution just before adding MWCNT's. After immersion in each of the solutions, the MWCNTs were isolated by vacuum filtration, followed by rinsing with 100 mL DI. The resulting plated MWCNTs were dried in vacuum oven at 70° C. FIG. 2A shows an SEM image of MWCNTs decorated with silver particles, which show up as bright spots in the image. FIG. 2B is an SEM image of the MWCNTs decorated with silver particles (bright spots in the image) on a TEM holder.

Figure 2C:
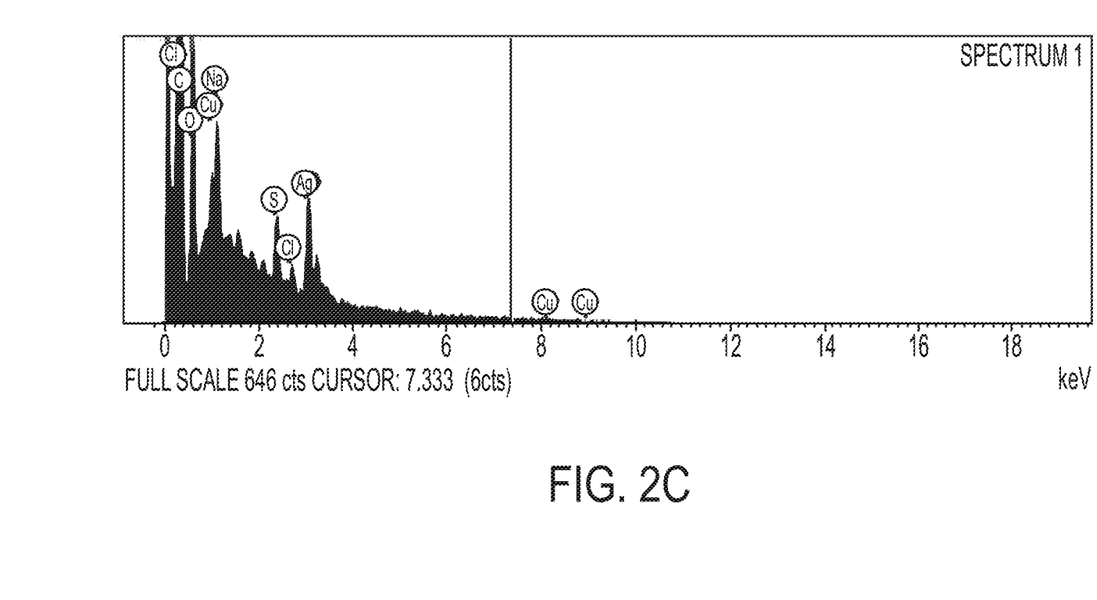
FIG. 2C shows an Energy Dispersive Spectroscopy (EDS) spectrum of MWCNTs decorated with silver particles (from the circular radius in FIG. 2B), according to an example of the present disclosure.

FIG. 2C shows an Energy Dispersive Spectroscopy (EDS) spectrum of MWCNTs decorated with silver particles (from the circular radius in FIG. 1B). The silver peak is apparent around 2.5 keV. The Cl, O, Cu, Na, and S peaks in the EDS spectrum are background signals from the TEM holder on which the plated MWCNTs are mounted.

Example 2—Preparation of Silver Coated MWCNTs Composites

Conductive polymer composites were prepared by melt mixing using a twin-screw Haake Rheocord mixer. The polymer base (polycaprolactone (PCL)) was mixed with the silver plated MWCNTs in the Haake at 70° C. for 30 minutes at 30 rpm.

The resulting Ag plated MWCNTs in PCL composite material was cryogenically ground and further processed into a filament (d=1.75 mm) using a Tinius Olson Melt Flow Indexer (MFI) with a modified die (diameter=1.8 mm) and weight of 16.96 kg at 100° C. and 150° C., respectively.

Example 3

The filament of Example 2 was cut into 10 cm segments and silver paint (SPI supplies) was applied to the ends. The silver paint was used to ensure good connection between the sample and a clamp of the resistivity apparatus. A two point probe resistivity apparatus was used to measure volume resistivity. Volume resistivity was converted to bulk conductivity using the formula 1 above. Results are shown in Table 1 below.

Example 4

A composite filament similar to that of Example 2 and 3 was made, except that 10% by weight silver flakes were included in addition to the 10% by weight silver-plated MWCNTs. Bulk conductivity of the Ag plated MWCNTs+ silver flake in PCL was determined similarly as described in Example 3. Results are shown in Table 1.

Figure 3A:
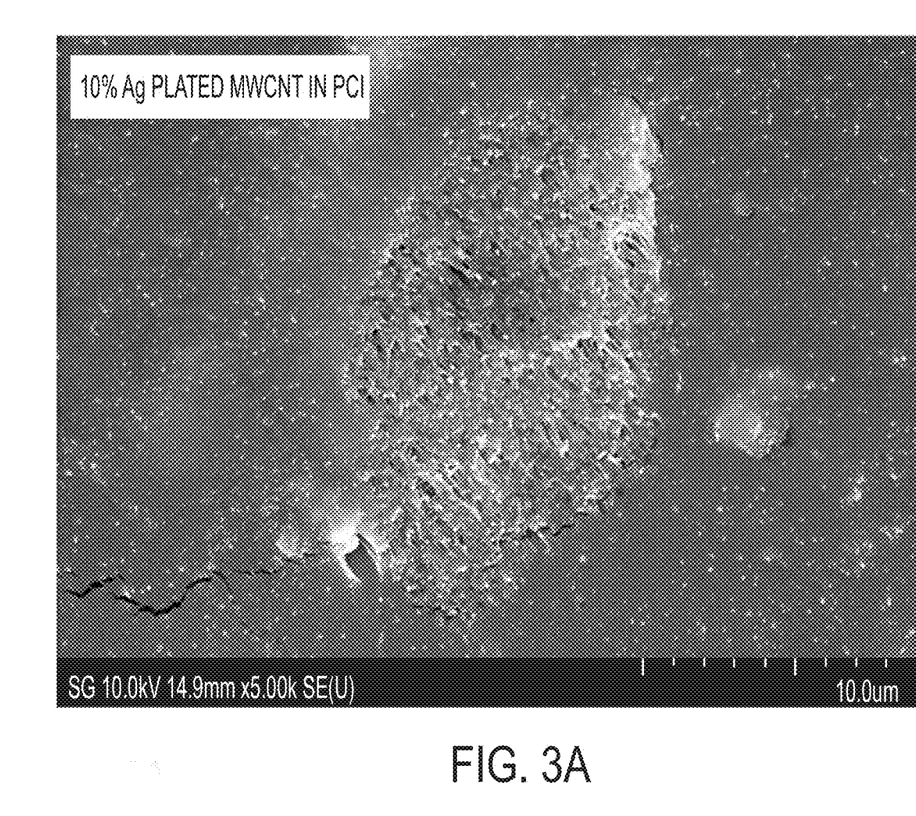
FIG. 3A shows 10% by weight silver plated multiwalled carbon nanotubes in PCL, according to an example of the present disclosure.
Figure 3B:
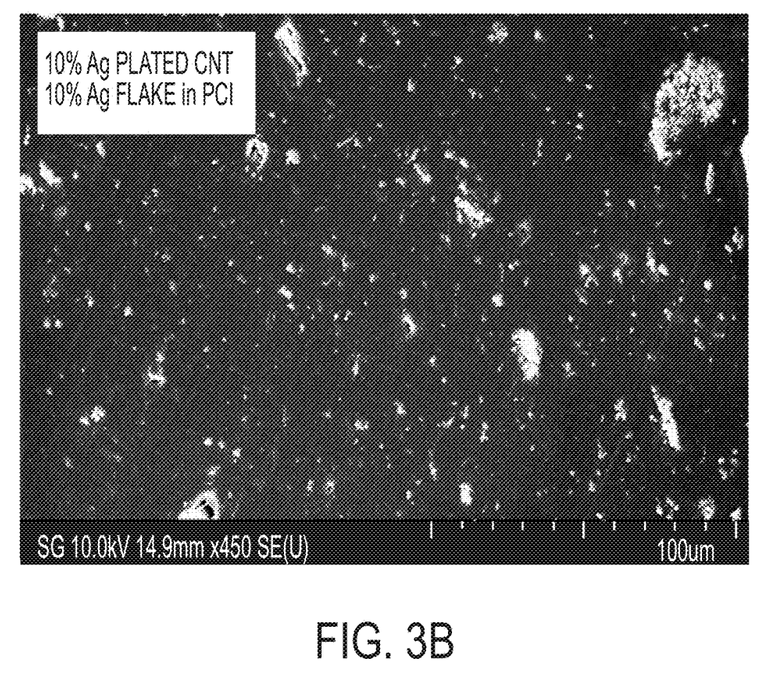
FIG. 3B shows 10% by weight silver plated multiwalled carbon nanotubes plus 10% by weight silver flakes in PCL, according to an example of the present disclosure.

FIGS. 3A and 3B show SEM images of a cross-section of a composite filament comprising a) 10 wt % Ag plated MWCNT in PCL from Example 3 (FIG. 3A), and b) 10 wt % Ag plated MWCNT+10 wt % Ag Flake in PCL from Example 4 (FIG. 3B). FIG. 3A shows dispersed silver as well as an agglomerated mass of Ag plated CNTs. FIG. 3B shows the dispersed Ag Flake and distributed agglomerates of Ag plated CNTs.

Comparative Example A

A composite filament similar to that of Example 2 and 3 was made, except that the metal plated CNTs were replaced with 10% by weight MWCNTs not plated with metal. Bulk conductivity was determined similarly as described in Example 3 and the results are shown in Table 1.

Comparative Example B

A composite filament similar to that of Example 2 and 3 was made, except that the 10% by weight MWCNTs were not plated with metal and 30% silver nanoparticles were included in the thermoplastic polymer. Bulk conductivity was determined similarly as described in Example 3 and the results are shown in Table 1.

Comparative Example C

A composite filament similar to that of Example 2 and 3 was made, except that the MWCNTs were replaced with 65% by weight Ag flakes. Bulk conductivity was determined similarly as described in Example 3 and the results are shown in Table 1.

Comparative Example D

A composite filament similar to that of Example 2 and 3 was made, except that the MWCNTs were replaced with 39% by weight Ag nanoparticles. Bulk conductivity was determined similarly as described in Example 3 and the results are shown in Table 1.

As shown by the bulk conductivity measurements of Table 1, about a 15% increase in conductivity was observed between i) PCL with 10 wt % MWCNT (0.55 S/cm) and ii) PCL with 10 wt % MWCNT plated with silver (Ag) (0.65 S/cm). Since a similar composite material made by combining 10 wt % MWCNT and 30% silver nanoparticle (AgNP) in PCL resulted in a much lower conductivity (0.07 S/cm), it is believed that the direct plating of the silver onto the MWCNT improves the conductivity. It is believed that the Ag plated directly onto the MWCNTs reduces contact resistance and alleviates the necessity of the MWCNTs to be neatly aligned in order to π-stack the aromatic rings to generate the percolating network; the plated metal allows more random orientation of the CNTs by providing the metal contact points. It is noted that a 39 wt % AgNP in PCL measures 0 S/cm for conductivity. It is also noted that the silver nanoparticles of Comparative Example B actually reduced conductivity compared to the MWNTs without the silver nanotubes of Comparative Example A, which was not expected. While it is not clear why this occurred, one possible explanation is that the presence of the Ag nanoparticles caused the MWNTs to aggregate more so that they did not form the desired percolating network.

An additional 20% increase in conductivity was observed between i) 10 wt % MWCNT plated with silver (Ag) in PCL (0.65 S/cm) and ii) 10 wt % MWCNT plated with silver (Ag)+10 wt % Ag Flake (2-5 µm) in PCL whereas 0 S/cm was measured for 65% (2-5 µm) Ag flake alone in PCL.

TABLE 1

Comparison of the bulk conductivity (S/cm) of composite materials

| Composite Material in PCL | Conductivity (S/cm) |
|---|---|
| Comparative Example A (10 wt % MWCNT) | 0.55 |
| Example 3 (10 wt % MWCNT plated with Ag) | 0.65 |
| Example 4 (10 wt % MWCNT plated with Ag + 10 wt % Ag Flake) | 0.80 |
| Comparative Example B (10 wt % MWCNT + 30% AgNP) | 0.07 |
| Comparative Example C (65 wt % Ag Flake) | 0 |
| Comparative Example D (39 wt % AgNP) | 0 |

Example 5—Printing of the Materials

The filaments were printed using a Makerbot FDM 3D printer to form printed beams. The printed beams (75 mm by 9 mm by 3 mm) were used to determine the flex modulus of the material. Table 2 describes the printing parameters used to print each polymer composite filament.

TABLE 2

Makerbot printing parameters for PCL and the composite materials.

| Material | Extruder Temp (° C.) | Layer Height (µm) | Number of Shells | Feed Rate (mm/s) | Feed Stock Multiplier | Platform Temp (° C.) |
|---|---|---|---|---|---|---|
| PCL | 100 | 200 | 3 | 40 | 0.93 | 25 |
| PCL + 10 wt % MWCNT | 200 | 200 | 3 | 20 | 0.93 | 25 |
| PCL + 10 wt % MWCNT plated with Ag | 200 | 200 | 3 | 20 | 0.93 | 25 |
| PCL + 10 wt % MWCNT plated with Ag + 10 wt % Ag Flake | 240 | 200 | 3 | 30 | 0.93 | 25 |

Table 3 summarizes some of the mechanical properties of the series of filaments in PCL as described in the Examples above. The PCL filament without additives was made to the same dimensions as the filament of the above Example 3 for comparison purposes. The Young's modulus and the Flex modulus both indicate that the composite materials maintain a very similar flexibility as compared to the base polymer material PCL despite the addition of CNT fillers. ASTM D638 method was used to determine the Young's modulus of the materials. ASTM D790 Plastic Flexural 3 Point Bend Test was used to determine the flexural modulus of the materials.

TABLE 3

Comparison of the Young's Modulus (GPa) of composite materials

| Material | Young's Modulus (MPa) | Flex Modulus (MPa) |
|---|---|---|
| PCL | 241 | 352 |
| PCL + 10 wt % MWCNT (Comparative Example A) | 349 | 408 |
| PCL + 10 wt % MWCNT plated with Ag (Example 3) | 436 ± 96 | 496 |
| PCL + 10 wt % MWCNT plated with Ag + 10 wt % Ag Flake (Example 4) | 363 ± 89 | 500 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A conductive polymer composite, comprising:
a thermoplastic polymer comprising at least one polymer selected from the group consisting of polybenzimidazoles, poly(ethylene-co-vinylacetate), poly(styrene isoprene styrene), poly(Styrene Ethylene Butylene Styrene) (SEBS), polylactic acid (PLA) and polycaprolactone;
a plurality of metal-plated carbon nanotubes, the metal-plated carbon nanotubes are in an amount ranging from about 5% to about 50% by weight, relative to the total weight of the conductive polymer composite; and
a plurality of conductive metallic flakes comprising silver, the conductive metallic flakes being in an amount ranging from about 5% to about 50% by weight, relative to the total weight of the conductive polymer composite,
wherein the thermoplastic polymer, metal-plated carbon nanotubes and the plurality of conductive metallic flakes are combined to form a mixture, and
wherein the conductive polymer composite demonstrates an increase in conductivity compared to the same composites made with non-metal plated carbon nanotubes, the conductive polymer composite having a bulk conductivity of 0.6 S/cm to about 200 S/cm, where the conductivity is calculated using the formula $\alpha = L/(R*A)$, based on the measured resistance (R) of an extruded filament made from the composite and having silver painted tips, the filament having a length (L) of 10 cm and a diameter of 1.75 mm.

2. The composite of claim 1, wherein the at least one polymer is selected from the group consisting of polybenzimidazoles, polylactic acid (PLA) and polycaprolactone.

3. The composite of claim 1, wherein the thermoplastic polymer is in an amount ranging from about 30% to about 99.5% by weight, relative to the total weight of the conductive polymer composite.

4. The composite of claim 1, wherein the metal plating of the metal-plated carbon nanotubes comprises at least one metal selected from the group consisting of silver, copper, nickel, palladium, gold and cobalt.

5. The composite of claim 4, wherein the metal plating is an alloy comprising the at least one metal.

6. The composite of claim 1, wherein the metal-plated carbon nanotubes are electrolessly plated carbon nanotubes.

7. The composite of claim 1, wherein the metal-plated carbon nanotubes are in an amount ranging from about 10% to about 50% by weight, relative to the total weight of the conductive polymer composite.

8. The composite of claim 1, wherein the conductive metallic flakes comprise silver.

9. The composite of claim 1, wherein the conductive metallic flakes are in an amount ranging from about 10% to about 50% by weight, relative to the total weight of the conductive polymer composite.

10. The composite of claim 1, further comprising at least one carrier liquid, the composite being in the form of a paste.

11. The composite of claim 1, wherein the composite has less than 5% liquid carrier.

12. The conductive polymer composite of claim 1, wherein the conductive polymer composite consists of the thermoplastic polymer, the plurality of metal-plated carbon nanotubes, the plurality of conductive metallic flakes, optionally a carrier liquid, optionally a plasticizer, optionally a dispersant and optionally a surfactant.

13. The conductive polymer composite of claim 1, wherein the conductive polymer composite consists essentially of the thermoplastic polymer, the plurality of metal-plated carbon nanotubes, the plurality of conductive metallic flakes, optionally a carrier liquid, optionally a plasticizer, optionally a dispersant and optionally a surfactant.

14. The conductive polymer composite of claim 1, wherein the metal-plated carbon nanotubes are in an amount ranging from about 10% to about 50% by weight, relative to the total weight of the conductive polymer composite, the metal plating of the metal-plated carbon nanotubes comprising silver, and the plurality of conductive metallic flakes comprise silver and are in an amount ranging from about 10% to about 50% by weight, relative to the total weight of the conductive polymer composite.

15. A conductive polymer composite filament, comprising:
a thermoplastic polymer comprising at least one polymer selected from the group consisting of polybenzimidazoles, poly(ethylene-co-vinylacetate), poly(styrene isoprene styrene), poly(Styrene Ethylene Butylene Styrene) (SEBS), polylactic acid (PLA) and polycaprolactone;
a plurality of metal-plated carbon nanotubes, the metal-plated carbon nanotubes are in an amount ranging from about 5% to about 50% by weight, relative to the total weight of the conductive polymer composite; and
a plurality of conductive metallic flakes comprising silver, the conductive metallic flakes being in an amount ranging from about 5% to about 50% by weight, relative to the total weight of the conductive polymer composite,
wherein the thermoplastic polymer, metal-plated carbon nanotubes and the plurality of conductive metallic flakes are combined to form a mixture, wherein the conductive polymer composite demonstrates an increase in conductivity compared to the same composites made with non-metal plated carbon nanotubes, the conductive polymer composite having a bulk conductivity of 0.6 S/cm to about 200 S/cm, where the conductivity is calculated using the formula σ=L/(R*A), based on the measured resistance (R) of an extruded filament made from the composite and having silver painted tips, the filament having a length (L) of 10 cm and a diameter of 1.75 mm.

16. The conductive polymer composite filament of claim 15, wherein the metal plating of the metal-plated carbon nanotubes comprises at least one metal selected from the group consisting of silver, copper, nickel, palladium, gold and cobalt.

17. The conductive polymer composite filament of claim 15, wherein the conductive polymer composite consists of the thermoplastic polymer, the plurality of metal-plated carbon nanotubes, the plurality of conductive metallic flakes, optionally a carrier liquid, optionally a plasticizer, optionally a dispersant and optionally a surfactant.

18. The conductive polymer composite filament of claim 15, wherein the conductive polymer composite consists essentially of the thermoplastic polymer, the plurality of metal-plated carbon nanotubes, the plurality of conductive metallic flakes, optionally a carrier liquid, optionally a plasticizer, optionally a dispersant and optionally a surfactant.

19. A method of three dimensional printing, the method comprising:
providing a composite to a three-dimensional printer, the composite comprising a thermoplastic polymer, a plurality of metal-plated carbon nanotubes and a plurality of conductive metallic flakes, the thermoplastic polymer comprising at least one polymer selected from the group consisting of polybenzimidazoles, poly(ethylene-co-vinylacetate), poly(styrene isoprene styrene), poly(Styrene Ethylene Butylene Styrene) (SEBS), polylactic acid (PLA) and polycaprolactone, wherein the thermoplastic polymer, metal-plated carbon nanotubes and the plurality of conductive metallic flakes are combined to form a mixture;
heating the composite; and
extruding the heated composite onto a substrate to form a three dimensional object,
wherein the conductive polymer composite demonstrates an increase in conductivity compared to the same composites made with non-metal plated carbon nanotubes, the conductive polymer composite having a bulk conductivity of 0.6 S/cm to about 200 S/cm, where the conductivity is calculated using the formula σ=L/(R*A), based on the measured resistance (R) of an extruded filament made from the composite and having silver painted tips, the filament having a length (L) of 10 cm and a diameter of 1.75 mm, and
wherein the metal-plated carbon nanotubes are in an amount ranging from about 5% to about 50% by weight, relative to the total weight of the conductive polymer composite, and the plurality of conductive metallic flakes comprise silver and are in an amount ranging from about 5% to about 50% by weight, relative to the total weight of the conductive polymer composite.

20. The method of claim 19, wherein the heated composite is in the form of a filament.

* * * * *